Patented July 8, 1930

1,770,108

UNITED STATES PATENT OFFICE

EARLE C. PITMAN, OF PARLIN, NEW JERSEY, ASSIGNOR TO E. I. DU PONT DE NEMOURS & COMPANY, OF WILMINGTON, DELAWARE, A CORPORATION OF DELAWARE

PROCESS OF REDUCING THE VISCOSITY OF NITROCELLULOSE SOLUTIONS

No Drawing. Application filed October 16, 1922, Serial No. 594,994. Renewed September 26, 1923.

This invention relates to a process of reducing the viscosity of nitrocellulose solutions without changing the ratio of nitrocellulose to solvent, and comprises subjecting such solutions to the action of a substance which, in aqueous solution, has an alkaline reaction, such as an alkali, or a salt resulting from the combination of a strong base with a weak acid.

While it has been known that viscosity could be made lower by high temperature nitration or by continued boiling of the pyroxylin, both of these methods are expensive and relatively ineffective as compared with my new process.

In my application Serial No. 491,596, of which this application is a continuation in part, I have described and claimed a process of reducing the viscosity of nitrocellulose solutions by subjecting the same to the action of an alkali-forming metal salt of a lower, monobasic aliphatic acid, for example sodium acetate. I have also discovered in the course of my investigations that various other substances are capable of effecting a reduction in the viscosity of nitrocellulose solutions, and that all of such substances are characterized by the alkalinity of their aqueous solutions. The viscosity-reducing substances coming within the scope of my invention include, in addition to the alkali-forming metal salts mentioned in my aforesaid application, the alkali-forming metal hydroxides such as the hydroxides of sodium, potassium, ammonium, barium, and calcium; the salts resulting from the combination of said hydroxides with weak acids such as carbonic acid, tetraboric acid, and certain organic acids; and various organic substances of alkaline reaction, as for example urea.

One object of my invention is to produce a nitrocellulose solution of considerably reduced viscosity without materially modifying its other desirable characteristics. Substances which, though reducing viscosity, also effect a radical change in the chemical constitution of the nitrocellulose, are usually undesirable. Thus strong reducing agents and strong denitrating agents such as the sulphides of calcium and of sodium are not included as viscosity-reducing agents in the practice of my invention. In general I may use as viscosity-reducers substances whose solutions are alkaline and which have substantially less denitrating power or substantially less reducing power than calcium sulphide.

To effect the desired reduction in viscosity only a small proportion of the alkaline substance, based on the weight of nitrocellulose, is necessary, the proportion required depending mainly upon the basic strength of the particular substance being used. For instance the proportion of an alkali-metal hydroxide, such as sodium hydroxide, may be as little as 0.05%, whereas the proportion of borax ($Na_2B_4O_7.12H_2O$) or sodium acetate may be as much as 5%, based on the nitrocellulose. As an illustration of the extent to which the proportion required depends upon the nature of the viscosity-reducing substance, 0.2% of NaOH is approximately as effective as 2% of sodium acetate or 3% of borax.

The reduction of viscosity according to my invention is effected by incorporating the alkaline substance in the nitrocellulose solution to form a homogeneous mixture, and then either allowing the mixture to stand for several days at room temperature, that is, between about 22 and 25° C., or mildly heating the mixture to a temperature less than 60° C. while preventing the escape of solvent.

The new process may be illustrated by the following example:—

A pyroxylin solution is prepared having the following composition:

| | Parts by weight |
|---|---|
| Pyroxylin | 20 |
| Camphor | 3 |
| Fusel oil | 10 |
| Wood alcohol | 67 |

0.02 parts of sodium hydroxide are incorporated in the above-described solution, and the mixture is allowed to stand at 45° C. for one week.

The proportion of the sodium hydroxide may be varied within a wide range; ordinarily this range will have as limits 0.05% and 0.25% based on the nitrocellulose.

The pyroxylin solution may be prepared with any of the customary solvents such as ethyl or amyl acetate, acetone, with or without diluents such as benzene, toluene, or ethyl alcohol.

With respect to the temperature at which the pyroxylin solution should be kept after the incorporation of the alkaline viscosity-reducer, I have found that a temperature between 40 and 50° C. gives best results.

In the preferred form of my invention, as illustrated by the above specific example, the whole amount of the viscosity-reducer required is added at once. Where the viscosity-reducer is very strongly alkaline, as in the case of an alkali-metal hydroxide, it may be found desirable to add it in the form of successive small doses, the interval between successive doses being long enough to allow the preceding dose of hydroxide to become substantially neutralized through the gradual reaction with acids normally present in slight amounts in the pyroxylin solution to form the nitrate, nitrite, oxalate, etc. of the alkali-metal. By following this procedure, a greater total amount of alkali-metal hydroxide may be added without injury to the pyroxylin solution, than when the whole amount of the hydroxide is added at once. The alkali-metal hydroxides are so soluble in the ordinary solvent mixtures ordinarily employed as to dissolve readily therein. Various other alkaline substances such as calcium and barium hydroxides are not very soluble in the ordinary pyroxylin solvents and a part thereof may remain in suspension in the solvent when they are used as viscosity reducers; despite this fact, the alkaline earth metal hydroxides are very effective in lowering viscosity.

The injurious effect of adding all at once between 1 and 2% sodium hydroxide, instead of 0.2%, is not only the formation of a solution having the viscosity of water, but also the saponification of part of the pyroxylin and consequent precipitation of cellulose. I have discovered that it is possible to add at one time a relatively large proportion, say from 1 to 2%, of alkali-metal hydroxide without entailing the above-mentioned injurious effects, if care is taken to add an amount of a relatively strong mineral acid which is chemically equivalent to the alkali-metal hydroxide, as soon as the desired reduction in viscosity has been effected. The addition of the right amount of hydrochloric or sulphuric acid, for example, will serve to convert the alkaline alkali-metal compound present into a neutral hydrochloride or sulphate of the alkali-metal, neither the hydrochloride or sulphate having any appreciable viscosity-reducing action. Although the time required to effect reduction of viscosity may be shortened by following this modified procedure, the advantage gained is usually insufficient to compensate for the additional trouble and expense involved.

In the preferred form of my invention as illustrated in the specific example, the amount of viscosity-reducer added is just sufficent to bring about the desired reduction of viscosity. The viscosity-reducing power of the substance used is apparently terminated eventually by the combination of the metal radical of the viscosity-reducer with the nitric and nitrous acids which are gradually liberated from the nitrocellulose. The active agent in this reduction of viscosity appears to be the hydroxyl ion, whether the viscosity-reducing substance used be sodium hydroxide or sodium acetate. Where sodium acetate is used, this salt is probably gradually hydrolyzed with the formation of sodium ions, hydroxyl ions, and acetic acid, the sodium and hydroxyl ions being gradually converted into sodium nitrite, sodium nitrate, and water.

That the above theory may be inadequate seems to be indicated by my observation that in at least some cases the nitrocellulose solutions, which are ordinarily very slightly acid, have remained on the acid side after the addition of the alkaline viscosity-reducing substance.

The extent of the reduction of viscosity of an 18% nitrocellulose solution by the action of 1.1% borax (based on the nitrocellulose) at room temperature is shown in the following table:

| Period (days) | Viscosity at 25° C. (centipoises) |
|---|---|
| Initially | 18,500 |
| 1 | 11,500 |
| 4 | 7,000 |
| 7 | 5,000 |
| 14 | 3,000 |
| 41 | 1,700 |

I am aware that in prior investigations of nitrocellulose to determine the chemical effects thereon of alkalies, the nitrocellulose has been subjected to the action of alkalies or alkaline substances; but in all such cases the alkali or alkaline substance has been used in a comparatively concentrated condition, and the nitrocellulose has undergone far-reaching degradation, as indicated by the drop in the nitrogen content of the nitrocellulose to below 8 or 9%. According to my process, although there occurs a small decrease in the nitrogen content as evidenced by the formation of minute quantities of nitrites and nitrates, the decrease is carefully controlled so as not to bring the nitrogen content to below 10.5%, the decrease seldom exceeding 1%, and being usually about 0.5%. A nitrocellulose reduced in viscosity according to my process, but having a nitrogen content of more than 10.5%, still retains its desirable photographic film-forming properties, and is therefore of great value commercially.

I claim:

1. The process of reducing the viscosity of a nitrocellulose solution which comprises subjecting the nitro-cellulose in said solution to the action of an alkaline substance having a denitrating power substantially less than that of calcium sulphide, the amount of said alkaline substance used being insufficient to cause a reduction in the nitrogen content of the nitrocellulose to less than 10.5%.

2. The process of reducing the viscosity of a nitrocellulose solution which comprises subjecting the nitrocellulose in said solution to the action of an alkaline substance having a denitrating power substantially less than that of calcium sulphide, the amount of said alkaline substance being less than 5% based on the weight of the nitrocellulose, and causing conversion of said alkaline substance into a neutral salt to be completed when the desired reduction in viscosity has been effected.

3. A process as set forth in claim 1 in which the nitrocellulose solution is substantially neutral.

4. A process as set forth in claim 2 in which the nitrocellulose solution is substantially neutral.

5. The process of reducing the viscosity of a nitrocellulose solution which comprises mixing therewith an alkaline substance having a denitrating power substantially less than that of calcium sulphide, and allowing the resulting mixture to stand until the desired reduction in viscosity has occurred, the amount of said alkaline substance used being insufficient to cause a reduction in the nitrogen content of the nitrocellulose to less than 10.5%.

6. A process as set forth in claim 5 in which the nitrocellulose solution is substantially neutral.

7. The process of reducing the viscosity of a nitrocellulose solution which comprises subjecting the nitro-cellulose in said solution to the action of an hydroxide whose solution reacts distinctly alkaline, the amount of said hydroxide used being insufficient to cause a reduction in the nitrogen content of the nitrocellulose to less than 10.5%.

8. The process of reducing the viscosity of a nitro-cellulose solution having initially a very slight acidity, which comprises subjecting the nitrocellulose in said solution to the action of anhydroxide whose solution reacts distinctly alkaline, the amount of said hydroxide used being insufficient to cause a reduction in the nitrogen content of the nitrocellulose to less than 10.5%.

9. The process of reducing the viscosity of a nitrocellulose solution which comprises mixing therewith an hydroxide whose solution reacts distinctly alkaline, and allowing the resulting mixture to stand until the desired reduction in viscosity has occurred, the amount of said hydroxide used being insufficient to cause a reduction in the nitrogen content of the nitrocellulose to less than 10.5%.

10. A process as set forth in claim 5 in which the solution is allowed to stand at a temperature between 35 and 60° C.

11. A process as set forth in claim 9 in which the solution is allowed to stand at a temperature between 35 and 60° C.

12. A process as set forth in claim 9 in which the solution is allowed to stand at a temperature between 40 and 50° C.

13. The process of reducing the viscosity of a nitrocellulose solution which comprises mixing therewith an alkali-forming metal hydroxide, and allowing the resulting mixture to stand until the desired reduction in viscosity has occurred, the amount of said hydroxide used being insufficient to cause a reduction in the nitrogen content of the nitrocellulose to less than 10.5%.

14. A process as set forth in claim 13 in which the nitrocellulose solution is substantially neutral.

15. A process as set forth in claim 13 in which the solution is allowed to stand at a temperature between 35 and 60° C.

16. The process of reducing the viscosity of a nitrocellulose solution which comprises mixing therewith between 0.05 and 1%, based on the nitrocellulose present, of an alkali-forming metal hydroxide, and allowing the resulting mixture to stand until the desired reduction in viscosity has occurred.

17. A process as set forth in claim 16 in which the nitrocellulose solution is initially substantially neutral, and in which the solution containing the hydroxide is allowed to stand at a temperature between 35 and 60° C.

18. The process of reducing the viscosity of a nitrocellulose solution which comprises dissolving therein between 0.05 and 0.25%, based on the nitrocellulose present, of an alkali-metal hydroxide, and allowing the resulting solution to stand until the desired reduction in viscosity has occurred.

19. A process as set forth in claim 18 in which the solution to which the hydroxide has been added is allowed to stand at a temperature between 35 and 60° C.

20. A process as set forth in claim 18 in which the nitrocellulose solution is initially substantially neutral.

21. The process of reducing the viscosity of nitrocellulose solutions which comprises exposing a viscous solution of introcellulose to the action of less than one percent of an alkaline substance whereby the viscosity is reduced.

22. The process of reducing the viscosity of nitrocellulose solutions which comprises exposing a viscous solution of nitrocellulose to the action of a small amount of an alkaline substance miscible with the solvent employed.

23. The process of reducing the viscosity of a nitrocellulose solution which comprises subjecting it to the action of an alkaline substance, and stopping the action of the latter before the nitrogen content of the nitrocellulose has fallen below 10.5%.

In testimony whereof I affix my signature.

EARLE C. PITMAN.